(12) United States Patent
Iwama

(10) Patent No.: US 7,557,691 B2
(45) Date of Patent: Jul. 7, 2009

(54) OBSTACLE DETECTOR FOR VEHICLE

(75) Inventor: Takaaki Iwama, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 305 days.

(21) Appl. No.: 11/511,617

(22) Filed: Aug. 29, 2006

(65) Prior Publication Data

US 2007/0046450 A1    Mar. 1, 2007

(30) Foreign Application Priority Data

Aug. 31, 2005   (JP) .............................. 2005-251510

(51) Int. Cl.
*B60Q 1/00*     (2006.01)
(52) U.S. Cl. ................. 340/435; 340/436; 348/118
(58) Field of Classification Search ............... 340/435, 340/436, 935, 937; 348/118, 135, 148, 149, 348/159, E13.014; 382/154; 701/301
See application file for complete search history.

(56) References Cited

U.S. PATENT DOCUMENTS

| | | | | |
|---|---|---|---|---|
| 5,410,346 | A * | 4/1995 | Saneyoshi et al. | 348/118 |
| 6,215,519 | B1 * | 4/2001 | Nayar et al. | 348/159 |
| 6,476,731 | B1 * | 11/2002 | Miki et al. | 340/937 |
| 6,477,260 | B1 * | 11/2002 | Shimomura | 340/435 |
| 7,012,548 | B2 * | 3/2006 | Ishii et al. | 340/436 |
| 2006/0119472 | A1 * | 6/2006 | Tsuboi | 340/435 |
| 2007/0072154 | A1 * | 3/2007 | Akatsuka et al. | 434/69 |
| 2008/0031514 | A1 * | 2/2008 | Kakinami | 382/154 |
| 2008/0088707 | A1 * | 4/2008 | Iwaki et al. | 348/208.1 |

FOREIGN PATENT DOCUMENTS

| | | |
|---|---|---|
| EP | 1 030 188 A1 | 8/2000 |
| EP | 1 094 337 A2 | 4/2001 |
| EP | 1 170 697 A2 | 1/2002 |
| EP | 1 530 185 A2 | 9/2004 |
| EP | 1 526 387 A1 | 10/2004 |
| JP | 05-119147 | 5/1993 |
| JP | 05-210800 | 8/1993 |
| JP | 05-273339 | 10/1993 |
| JP | 2003-009141 | 1/2003 |
| JP | 2004-104478 | 4/2004 |

* cited by examiner

*Primary Examiner*—John A Tweel, Jr.
(74) *Attorney, Agent, or Firm*—Chapman and Cutler LLP

(57) ABSTRACT

An obstacle detector used for a vehicle includes: a plurality of photographing units configured to photograph scenes in vehicle surroundings; and a controller configured to carry out a first obstacle detection that detects an obstacle in the vehicle surroundings based on images photographed by at least two photographing units of the plurality of photographing units, and a second obstacle detection that detects the obstacle in the vehicle surroundings based on two image-frames photographed by at least one photographing unit of the plurality of photographing units, wherein the controller is configured to carry out at least the first obstacle detection in a region, photographed by the at least two photographing units, and carry out the second obstacle detection in a region photographed by the at least one photographing unit, of a photographed range photographed by the plurality of photographing units.

14 Claims, 12 Drawing Sheets

OBSTACLE DETECTOR FOR VEHICLE

BACKGROUND OF THE INVENTION

1. Field of the Invention

The present invention relates to an obstacle detector for a vehicle.

2. Description of the Related Art

Devices for detecting obstacles surrounding a vehicle have been in practical use today. The obstacle detectors for a vehicle may be divided broadly into two kinds, i.e., the detector utilizing a radar principle to detect the obstacles, and the detector utilizing cameras to detect the obstacles.

Usually, the obstacle detector for a vehicle utilizing the radar principle includes the following types, namely, lazar radar which transmits radar light and detects a position of an obstacle according to the arrival time of the lazar light reflected by the obstacle (for reference, see JP-H05-119147 A), millimeter-wave radar which transmits millimeter-wave in the GHz band and detects a position of an obstacle based on the arrival time of the millimeter-wave reflected by the obstacle (for reference, see JP-H05-273339 A), and supersonic sonar which transmits supersonic and detects a position of an obstacle based on the arrival time of the supersonic reflected by the obstacle (for reference, see JP-H05-210800 A), etc.

Additionally, the obstacle detector for a vehicle utilizing cameras usually includes the following, i.e., a device which detects an obstacle based on differences of images between two successive image-frames of a camera photographing a rear of the vehicle, and a stereo camera device which photographs the front of the vehicle with two cameras and detects an obstacle based on differences between a right image and a left image (for reference, see JP-2004-104478 A).

However, since the lazar radar includes a drive mechanism for scanning the lazar, and the millimeter-wave lazar includes a transmitting and receiving antenna, it is difficult to miniaturize each of them. In addition, they are highly expensive.

Further, although the supersonic is inexpensive, its resolution in the lateral direction is low and may only detect whether there is an object or not, therefore, it is unsuitable for recognizing the position and direction of the obstacle.

Additionally, if the device which detects the obstacle according to the differences of the images between the image-frames of the camera image is used, when the vehicle runs at a low speed, there is nearly no difference in images between the two successive image-frames, so there is a problem that the detection accuracy decreases.

Moreover, in the stereo camera device, there is a problem that the calculation accuracy of the differences between the right and left images gets worse, due to distortion of the lens of the camera, and the detection accuracy of the obstacle decreases. In addition, when the devices are attached to the vehicle, it is necessary to adjust the attachment for every vehicle with high accuracy, so that a large amount of labor is required.

Therefore, at least one object of the present invention is to provide an obstacle detector with high detection accuracy. The obstacle detector detects the obstacle based on the images converted into overhead images of the vehicle surroundings, and divides the area in the vehicle surroundings where the obstacle is to be detected into a plurality of regions, and utilizes properly a plurality of obstacle detection methods in accordance with the divided regions and running status of the vehicle, to improve the obstacle detection accuracy.

SUMMARY OF THE INVENTION

To achieve the object mentioned above, according to an aspect of the present invention, an obstacle detector used for a vehicle comprises: a plurality of photographing units configured to photograph scenes in vehicle surroundings, wherein each optical axis of the plurality of photographing units is disposed at different directions; and a controller configured to carry out a first obstacle detection that detects an obstacle in the vehicle surroundings based on images photographed by at least two photographing units of the plurality of photographing units, and a second obstacle detection that detects the obstacle in the vehicle surroundings based on two image-frames photographed by at least one photographing unit of the plurality of photographing units, wherein the controller is configured to carry out at least the first obstacle detection of the first and the second obstacle detections in a region, photographed by the at least two photographing units, of a photographed range photographed by the plurality of photographing units, and wherein the controller is configured to carry out the second obstacle detection in a region, photographed by the at least one photographing unit, of the photographed range photographed by the plurality of photographing units.

According to this construction, the vehicle surroundings are divided into a plurality of regions according to the photographing range of the plurality of cameras.

According to an embodiment of the present invention, the first obstacle detection is carried out such that images photographed by the at least two photographing units of the plurality of photographing units are converted into overhead images and the obstacle is detected based on differences between the overhead images obtained at a same time point. The second obstacle detection is carried out such that images photographed by the at least one photographing unit of the plurality of photographing units are converted into overhead images and the obstacle is detected based on differences between two image-frames of the overhead images.

According to this construction, the photographed images are converted into overhead images to carry out the obstacle detection. Therefore it is possible to eliminate the effects caused by distortion of a lens of the camera and/or position adjustment of the camera, so that the obstacle detection accuracy is improved.

According to an embodiment of the present invention, the controller is configured to utilize two image-frames with a long-time interval to carry out the second obstacle detection when the vehicle runs at a low speed, and utilize two image-frames with a short-time interval to carry out the second obstacle detection when the vehicle runs at a high speed.

According to this construction, the intervals of the image-frames to be compared are changed in accordance with the vehicle speed. Therefore, due to this operation, it is possible to improve the obstacle detection accuracy when the vehicle runs at the low speed with a few image variations between image-frames.

According to an embodiment of the present invention, the controller further includes a posture detector configured to detect a posture of the vehicle, and convert the photographed image into the overhead image based on the posture of the vehicle detected by the posture detector.

According to this construction, a conversion table in accordance with the posture of the vehicle is utilized when the photographed image is converted into the overhead image. This operation may eliminate the effects on variations of the photographed images resulting from variations of the vehicle posture; therefore, it is possible to improve the obstacle detection accuracy.

According to an embodiment of the present invention, the plurality of photographing units are disposed on the front, rear, right-side and left-side of the vehicle such that optical axis of two adjacent photographing units of the plurality of photographing units are transverse to each other.

According to this construction, it is possible to detect obstacles all around the vehicle.

According to an embodiment of the present invention, the controller is configured to give an alarm when the obstacle is detected to be approaching the vehicle based on a position of the detected obstacle.

According to this construction, the alarm is given only for the obstacle which is approaching the host vehicle, therefore, more alarms than necessary will not be given, and the driver and the passengers will not be bothered.

According to an embodiment of the present invention, the controller is configured to give an alarm when a position of the detected obstacle is within an anticipated course of the vehicle or not away from the left and right of the anticipated course for a predetermined distance, which anticipated course is calculated by an anticipated course calculator configured to calculate anticipated courses of the vehicle based on a steering angle of a steering wheel of the vehicle.

According to this construction, the alarm is given only for the obstacle which is at a position having a predetermined relationship with the anticipated course of the vehicle, therefore, more alarms than necessary will not be given, and the driver and the passengers will not be bothered.

According to an embodiment of the present invention, the alarm is a warning sound given out by a warning sound generator, which is connected to the controller.

According to this construction, it is possible to call the attention of the driver by the warning sound.

According to an embodiment of the present invention, the alarm is in a display in which a predetermined picture is overlapped in an image containing a detected obstacle of the photographed images which are photographed by the plurality of photographing units, and the overlapped image is displayed on a display unit provided inside the vehicle.

According to an embodiment of the present invention, the predetermined picture is overlapped between the obstacle and the vehicle and in the vicinity of the obstacle, in the image containing the detected obstacle.

According to this construction, it is possible to visually draw attention of the driver.

According to the present invention, it is possible to provide an obstacle detector for a vehicle which detects the obstacle based on the images converted into the overhead images of the vehicle surroundings, and divides the area in the vehicle surroundings where the obstacle is to be detected into a plurality of regions, and properly utilizes a plurality of obstacle detection methods in accordance with the divided regions and running status of the vehicle, to improve the obstacle detection accuracy.

The present application claims the benefit of priority to Japan Patent Application No. 2005-251510 filed on Aug. 31, 2005, which is hereby incorporated by reference.

BRIEF DESCRIPTION OF THE DRAWINGS

For a better understanding of the invention, reference is made to the attached drawings, where.

DETAILED DESCRIPTION OF THE PREFERRED EMBODIMENTS

Preferred embodiments of the present invention will be explained below by referring to the accompanying drawings. The scope of the invention, however, is not limited to these embodiments. Within the scope of the present invention, any structure and material can be appropriately modified.

Figure 1:
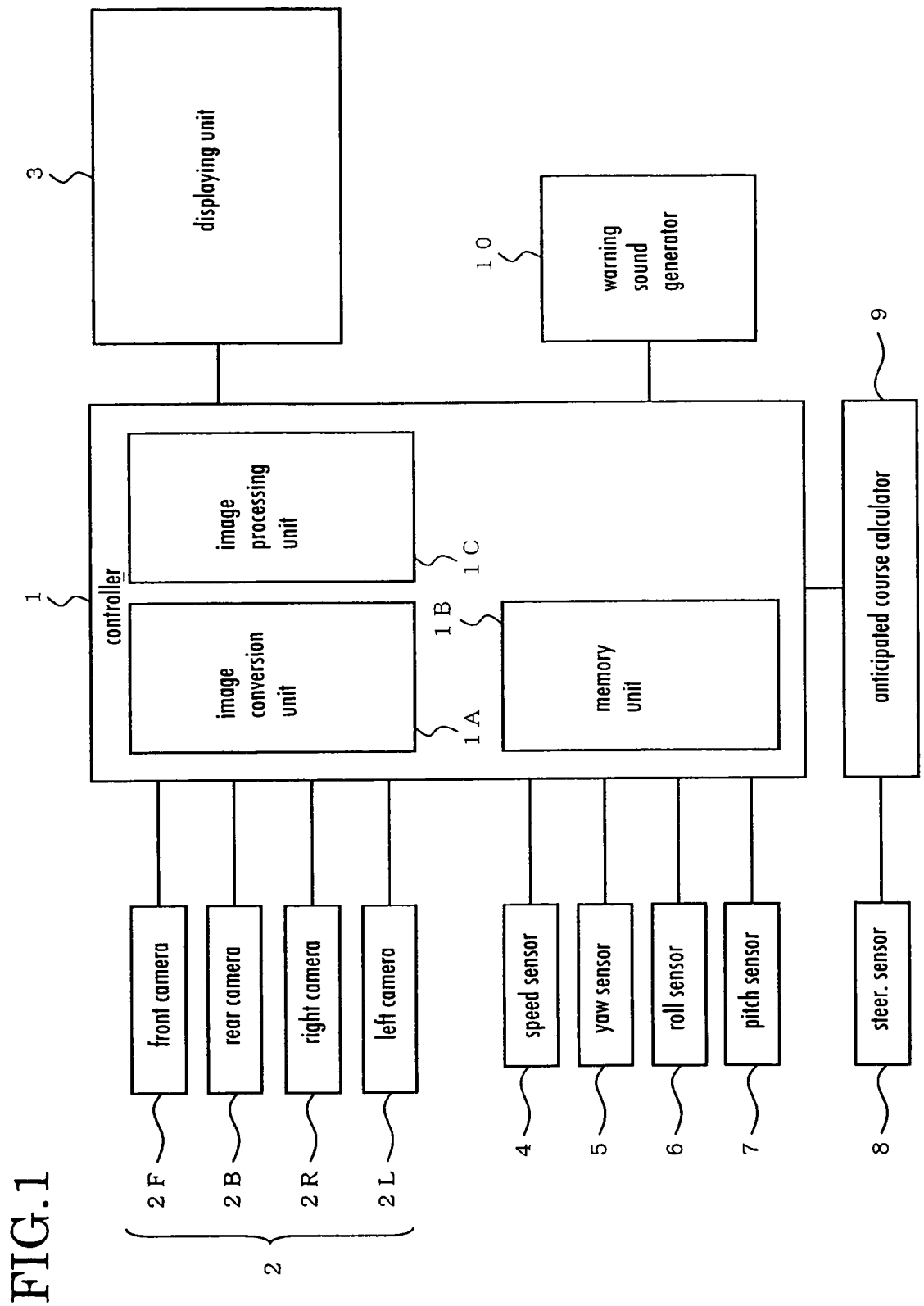
FIG. 1 is a block diagram showing an embodiment of the present invention.

FIG. 1 shows a block diagram of a preferred embodiment of the present invention.

A controller 1 is electrically connected with photographing camera units 2 and takes image signals output from the photographing camera units 2. The photographing camera units 2 include a front photographing camera 2F, a rear photographing camera 2B, a right-side photographing camera 2R and a left-side photographing camera 2L. The photographing camera units 2 correspond and structure a plurality of photographing units according to the present embodiment of the invention.

The controller 1 is equipped with an image conversion unit 1A for converting a taken image into an overhead image and/or a predetermined conversion image. The image conversion unit 1A has conversion tables used for carrying out each conversion, and a conversion of the image is carried out by replacing each pixel of an image photographed by the photographing camera units 2 with a coordinate position defined by the conversion tables. The conversion tables may be calculated and set previously, based on, such as positions of the photographing camera units 2 before and after conversion, photographing range, numbers of photographing pixels, and direction and size of the converted image, etc., although it is not limited thereto.

Here, the photographing camera units 2 are attached on a vehicle (will be described later), because visions of images are different even though the images are photographed by a same camera, between a case that the vehicle is parallel on a road surface and a case that the vehicle is on the road surface with an angle, therefore when the photographed images are converted into overhead images, it is necessary to consider postures of the vehicle. That is, it is necessary to prepare a plurality of conversion tables in accordance with the postures of the vehicle, and carry out the conversion into the overhead image in each case using the conversion table in accordance with the posture of the vehicle. Therefore, the image conversion unit 1A has a plurality of conversion tables in accordance with the postures of the vehicle.

The controller 1 is provided with a memory unit 1B for storing the taken images and the images converted by the image conversion unit 1A, temporarily.

The controller 1 is provided with an image processing unit 1C for overlapping information to a predetermined image. Outputs of the image processing unit 1C are displayed on a displaying unit 3 which is provided in the vehicle.

The controller 1 is electrically connected with a vehicle speed sensor 4 for detecting vehicle speed, a yaw-sensor 5 for detecting horizontal rotation direction of the vehicle, a roll-sensor 6 for detecting roll of the vehicle and a pitch-sensor 7 for detecting pitch of the vehicle, and the controller 1 takes output signals output by each sensor.

The controller 1 judges the vehicle speed based on the taken output value of the vehicle speed sensor 4, and calculates a linear displacement V (t) of the vehicle (will be described later) based on the vehicle speed.

The controller 1 calculates a posture of the vehicle using the taken output values of the yaw-sensor 5, the roll-sensor 6 and the pitch-sensor 7, and selects one of the conversion tables mentioned above according to the calculated posture of the vehicle, and then carries out conversions of the taken images of the photographing camera units 2. The yaw-sensor 5, the roll-sensor 6 and the pitch-sensor 7 and the controller 1 perform functions of a posture detector according to the preferred embodiment of the present invention.

The controller 1 takes an image and a coordinate of an anticipated course output by an anticipated course calculator 9 which is configured to calculate the anticipated course of the vehicle according to a steering angle detected by a steering angle sensor 8. The taken coordinate of the anticipated course is to be utilized when an obstacle alarm is raised (will be described later), and the image output by the anticipated course calculator 9 is to be overlapped on an image photographed by the photographing camera units 2 at the image processing unit 1C.

Figure 2:
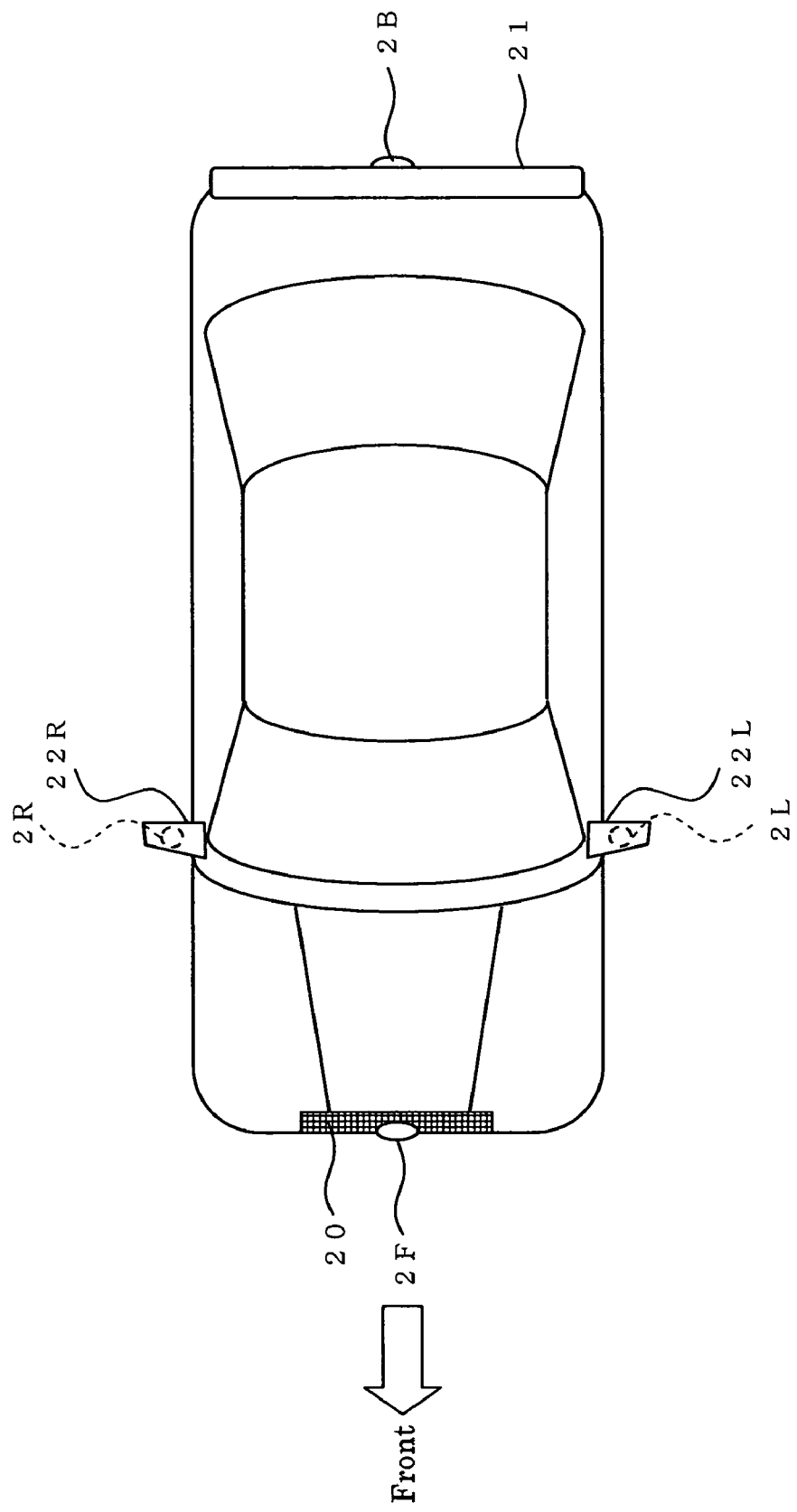
FIG. 2 is a figure showing attaching locations of photographing camera units 2 of an embodiment of the present invention.

FIG. 2 shows attaching positions of the photographing camera units 2.

The front photographing camera 2F is attached to substantially a central part of a front grill 20 on the front of the vehicle, and photographs front of the vehicle.

The rear photographing camera 2B is attached to substantially a central part of a rear spoiler 21 which is mounted on the rear of the vehicle, and photographs rear of the vehicle.

The right-side photographing camera 2R is attached inside the right side mirror 22R facing downward, and photographs the right side of the vehicle.

The left-side photographing camera 2L is attached inside the left side mirror 22L facing downward, and photographs the left side of the vehicle.

Figure 3:
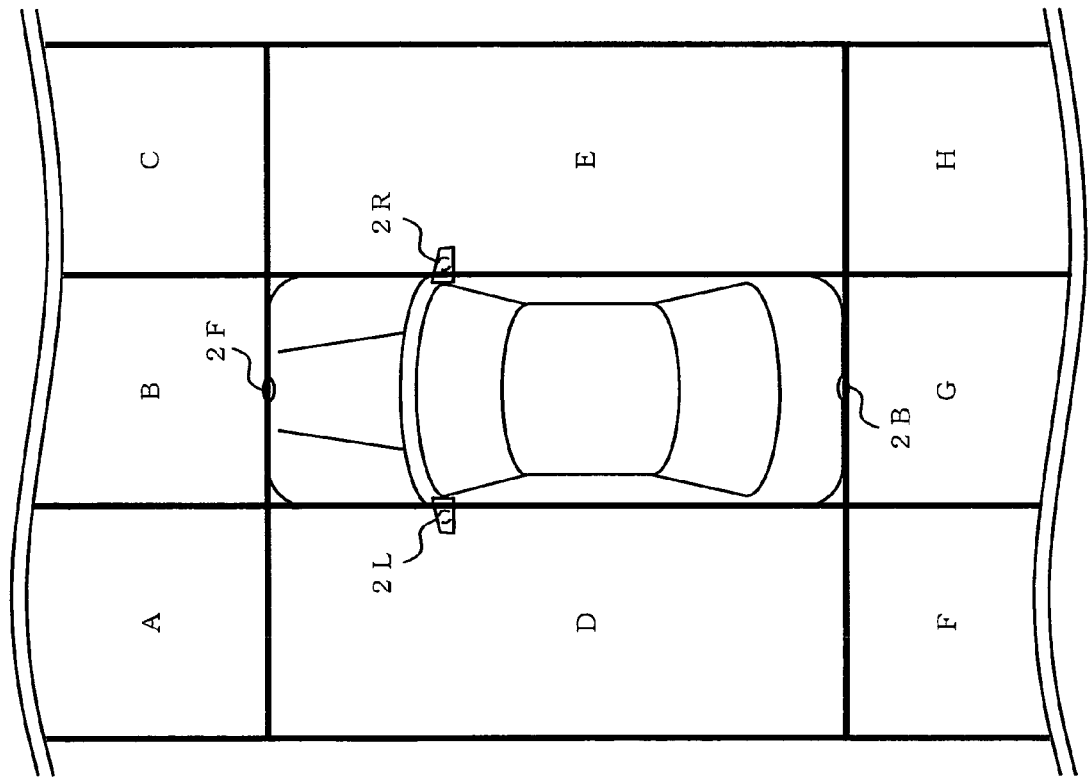
FIG. 3 is a figure showing photographing regions of the photographing camera units 2 of an embodiment of the present invention.

FIG. 3 shows photographing regions of each camera.

The photographing regions of the front photographing camera 2F include a region A, a region B and a region C. The photographing regions of the rear photographing camera 2B include a region F, a region G and a region H. The photographing regions of the right-side photographing camera 2R include the region C, a region E and the region H. The photographing regions of the left-side photographing camera 2L include the region A, a region D and the region F.

That is, the region A is photographed by the front photographing camera 2F and the left-side photographing camera 2L. The region B is only photographed by the front photographing camera 2F. The region C is photographed by the front photographing camera 2F and the right-side photographing camera 2R. The region D is only photographed by the left-side photographing camera 2L. The region E is only photographed by the right-side photographing camera 2R. The region F is photographed by the rear photographing camera 2B and the left-side photographing camera 2L. The region G is only photographed by the rear photographing camera 2B. The region H is photographed by the rear photographing camera 2B and the right-side photographing camera 2R.

Figure 4:
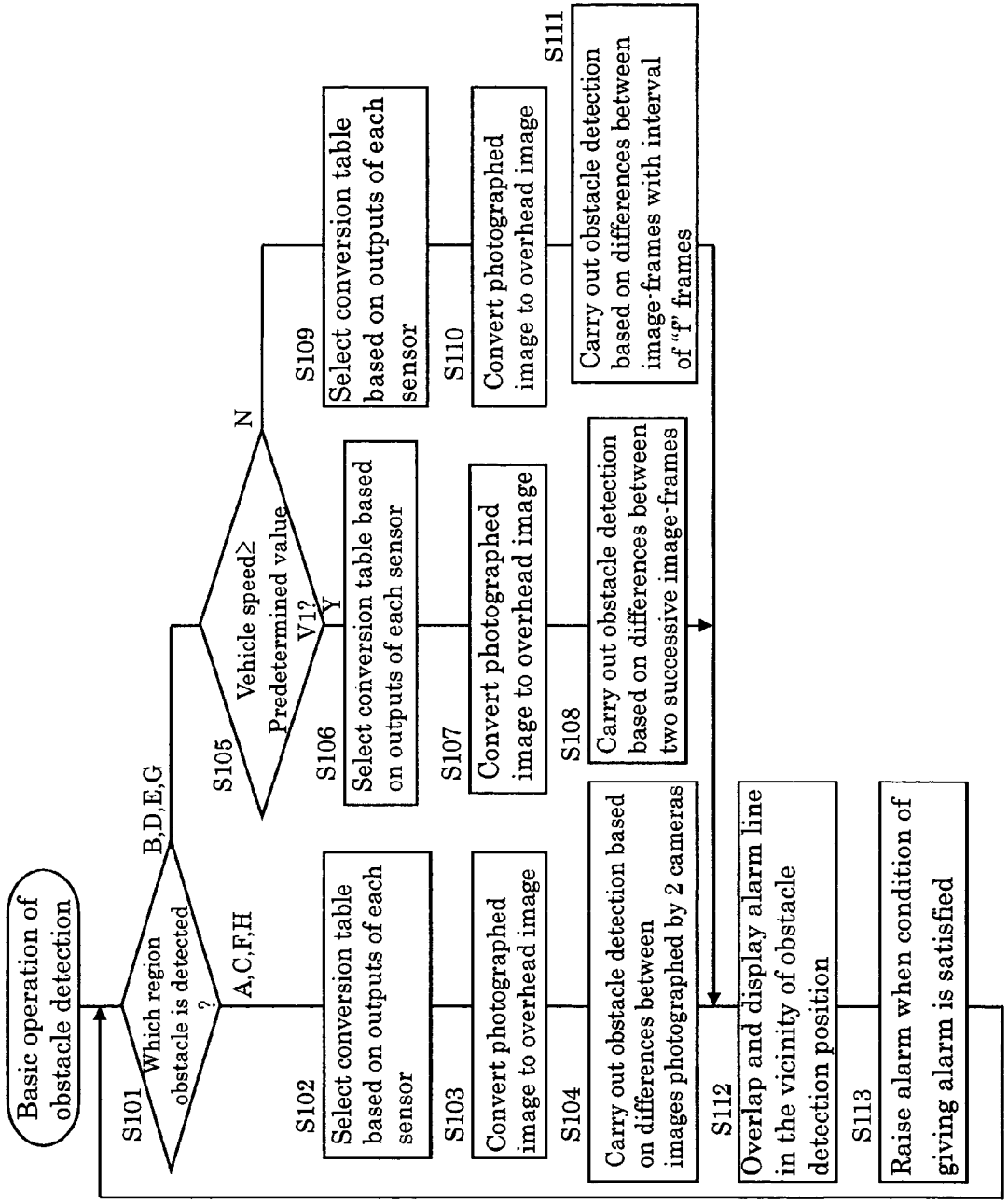
FIG. 4 is a flowchart illustrating basic operations of obstacle detection of an embodiment of the present invention.

Next, a basic operation of the obstacle detection in the present embodiment will be explained, accompanied with a flow chart shown in FIG. 4.

In step S101, a region where an obstacle is detected is judged. If the region where the obstacle is detected is at least one of the regions A, C, F and H, the flow moves to step S102, and the obstacle detection is carried out by two cameras. On the other hand, if the region where the obstacle is detected is at least one of the regions B, D, E and G, the flow moves to step S105, and the obstacle detection is carried out by one camera.

In step S102, the controller 1 calculates a posture of the vehicle using values of each output signal of the yaw-sensor 5, the roll-sensor 6 and the pitch-sensor 7, and then selects a conversion table for converting the image photographed by the photographing camera units 2 into an overhead image based on the calculated posture of the vehicle. The flow then moves to step S103.

In step S103, the image photographed by the photographing camera units 2 is converted into the overhead image using the conversion table selected in step S102. The flow then moves to step S104.

In step S104, a stereo image processing which detects an obstacle based on differences between images photographed by two cameras simultaneously (will be described later), is carried out. Then the flow moves to step S112.

In step S105, a vehicle speed detected by the vehicle speed sensor 4 is judged. When the vehicle speed is not less than a predetermined value V1, the flow moves to steps S106 to S108, and calculates the differences between two successive image-frames to carry out the obstacle detection. On the other hand, when the vehicle speed is less than the predetermined value V1, the flow moves to steps S109 to S111 that calculate the differences between two image-frames with f (>1) image-frames interval to carry out the obstacle detection, since the vehicle speed is low, and even differences between the two successive image-frames are calculated, the obstacle could not be detected with high accuracy due to the few differences.

In step S106, the controller 1 calculates a posture of the vehicle with values of each output signal of the yaw-sensor 5, the roll-sensor 6 and the pitch-sensor 7, and then selects a conversion table for converting the image photographed by the photographing camera units 2 into an overhead image based on the calculated posture of the vehicle. The flow then moves to step S107.

In step S107, the image photographed by the photographing camera units 2 is converted into the overhead image using the conversion table which is selected in step S106. The flow then moves to step S108.

In step S108, a motion-stereo processing which detects an obstacle based on differences between two successive image-frames (will be described later), is carried out. Then the flow moves to step S112.

In step S109, the controller 1 calculates a posture of the vehicle using values of each output signal of the yaw-sensor 5, the roll-sensor 6 and the pitch-sensor 7, and then selects a conversion table for converting the image photographed by the photographing camera units 2 into an overhead image based on the calculated posture of the vehicle. The flow then moves to step S110.

In step S110, the image photographed by the photographing camera units 2 is converted into the overhead image using the conversion table selected in step S109. After this, the flow moves to step S111.

In step S111, the motion-stereo processing which detects an obstacle based on the differences between two image-frames with "f" image-frames interval (to be described later), is carried out. The flow then moves to step S112.

In step S112, an alarm line is overlapped to be displayed in the vicinity of an obstacle detection position on an image which is displayed on the display unit 3.

In step S113, a predetermined alarm is raised when a condition of giving the alarm is satisfied. Here, at least one of a condition that the obstacle is in the vicinity of the anticipated course calculated by the anticipated course calculator 9, and a condition that the obstacle is approaching the vehicle, is defined as the condition of giving the alarm. In addition, at least one of a warning sound generated by a warning sound generator 10, and flashing of the alarm line, is defined as the predetermined alarm according to one embodiment of the invention.

By the above-mentioned operation flows, if regions where the obstacle is detected are the regions A, C, F and H that are photographed by two cameras, the obstacle detection is carried out by the stereo image processing after the photographed image being converted into the overhead image.

In addition, if the regions where the obstacle is detected are the regions B, D, E and G that are photographed by one camera, after the photographed image is converted into the overhead image, the motion-stereo processing which carries out the obstacle detection based on differences between two image-frames is carried out. In this case, when the vehicle speed is high (vehicle speed≧V1), the differences between two successive image-frames are calculated. On the other hand, when the vehicle speed is low, even the differences between the two successive image-frames are calculated, the differences are few, so that there is a possibility that the obstacle could not be detected. Therefore differences between two image-frames with an interval of f (>1) image-frames are calculated to achieve an improvement of the obstacle detection accuracy.

Additionally, the overhead conversion is carried out with the conversion table corresponding to the posture of the vehicle. Therefore, influences of the image variations resulting from variations of the postures of the vehicle are eliminated, and the obstacle detection accuracy is improved.

Meanwhile, the obstacle detection based on the stereo image processing mentioned-above is equivalent to the first obstacle detection in the preferred embodiment according to the present invention, and the obstacle detection based on the motion-stereo processing is equivalent to the second obstacle detection in the preferred embodiment according to the present invention.

Figure 5:
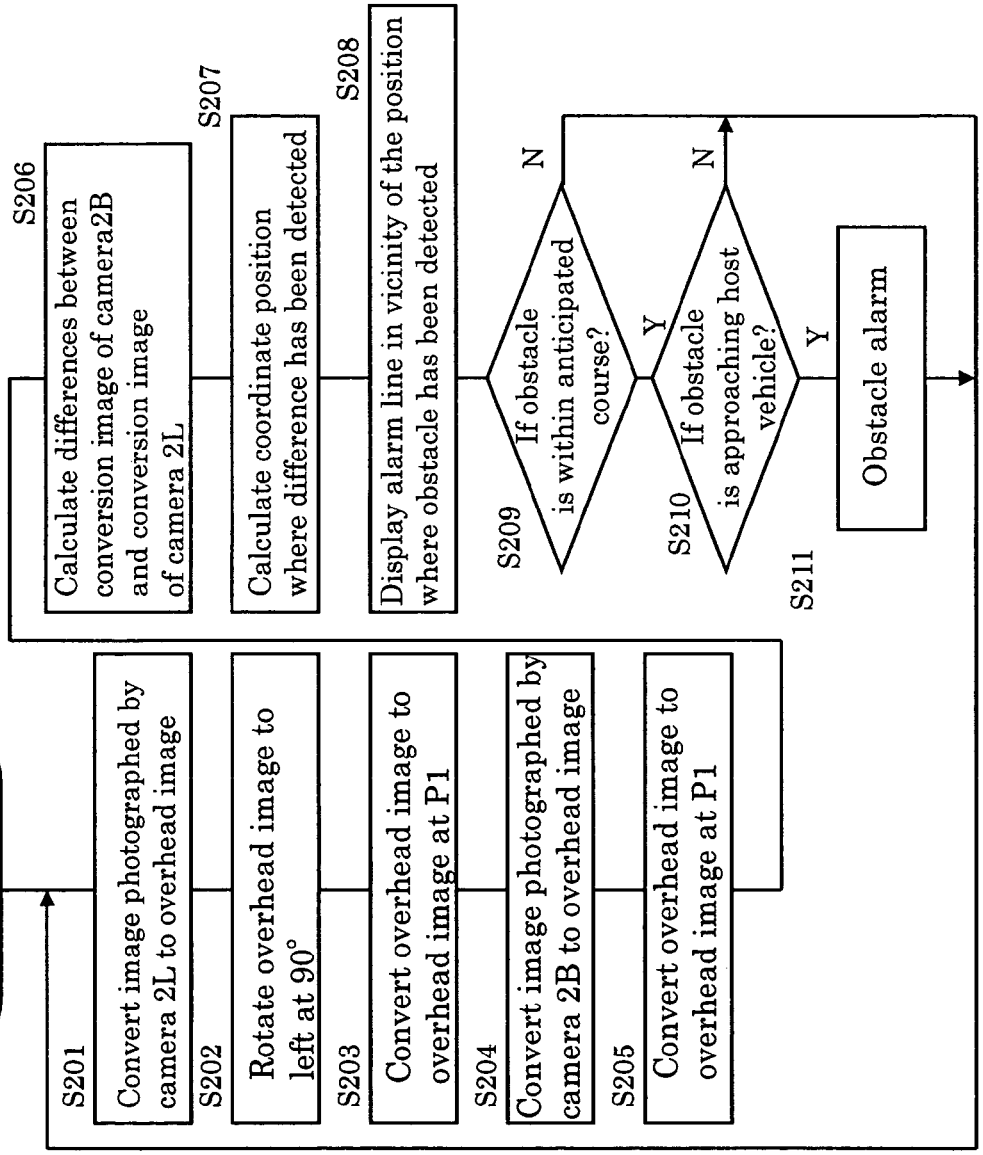
FIG. 5 is a flowchart illustrating the obstacle detection with two cameras of an embodiment of the present invention.

Next, operations of the obstacle detection in the regions A, C, F and H that are photographed by two cameras will be explained, accompanied with a flow chart shown in FIG. 5 and obstacle detection operations shown in FIG. 6 to FIG. 10. Here, the operation of the obstacle detection in the region F will be explained as an example.

Figure 6:
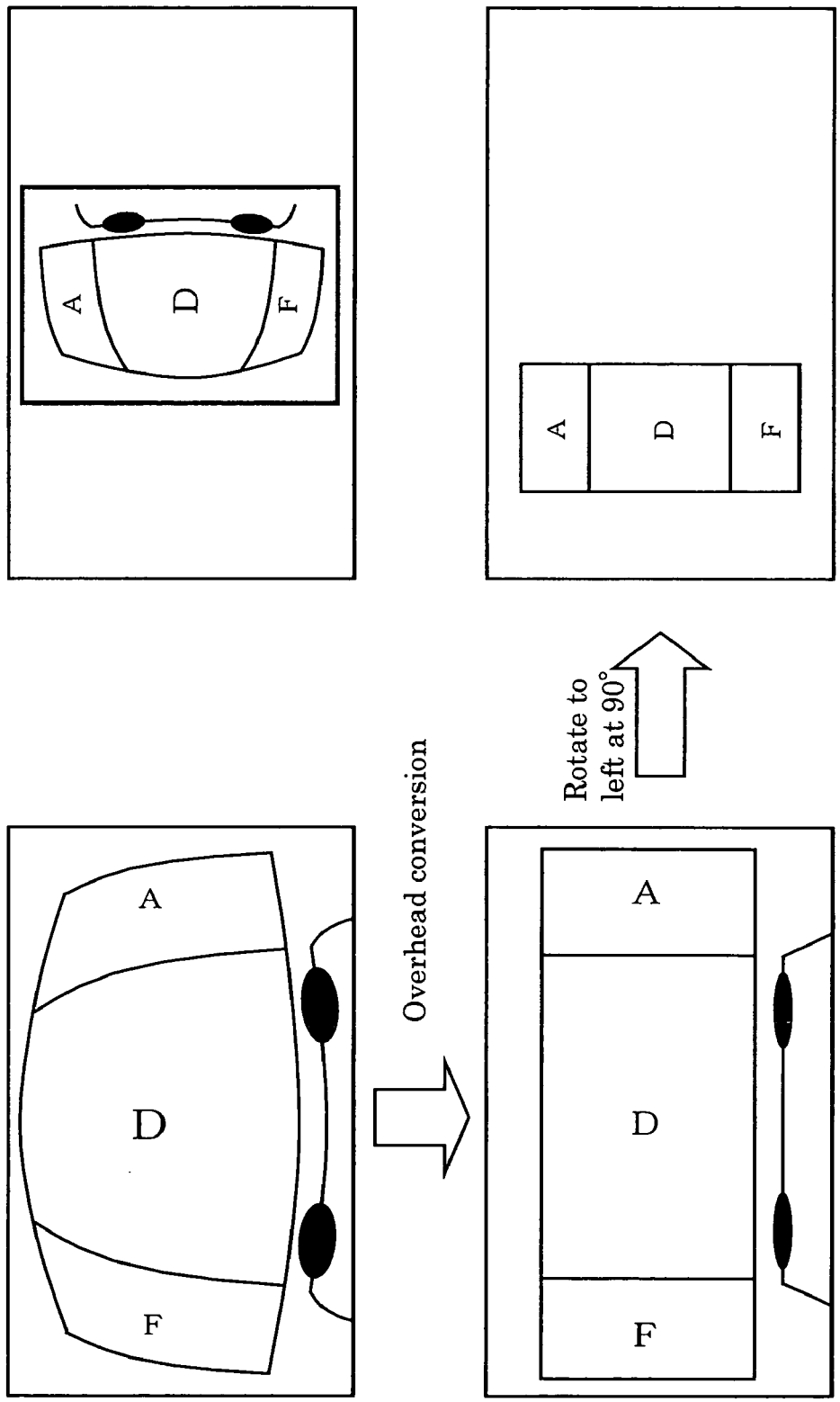
FIG. 6 is a figure showing an operation of the obstacle detection with two cameras of an embodiment of the present invention.

In step S201, an image photographed by the left-side photographing camera 2L is converted into an overhead image based on a conversion table selected in accordance with the posture of the vehicle. The image photographed by the left-side photographing camera 2L is photographed so as to broaden the photographing range in a cross direction of the vehicle, as shown in the upper left figure of FIG. 6 (Note that characters A, D and F in FIG. 6 are characters for explanation; they are not the ones inserted into the image photographed by the left-side photographing camera 2L). The image is an image with distortions caused by the lens, and the distortions increase as a photographing image angle increases. After the photographed image is converted into the overhead image to remove the distortions of the image, an image shown in the left lower figure of FIG. 6 is obtained. After this, the flow moves to step S202.

In step S202, the overhead image converted in step S201 is converted into an image as shown in the right lower figure of FIG. 6 by rotating the overhead image to the left at 90 degrees, as a pre-processing of differences calculation to be carried out later. Additionally, this step is not necessary when the image photographed by the left-side photographing camera 2L is photographed as shown in the upper right figure of FIG. 6. After this, the flow moves to step S203.

In step S203, the overhead image rotated to the left at 90 degrees in step S202 is converted into an overhead image at a position P1 in FIG. 7, as a pre-processing of differences calculation to be carried out later. Here, the position of P1 is located on a tangential line LL of the left side of the vehicle, and a distance L2 which is from P1 to an intersection point PC of the tangential line LL of a left side of the vehicle with a tangential line LB of a back end of the vehicle, is equals to a distance L1 which is from the intersection PC to the rear photographing camera 2B. By converting the overhead image into the overhead image at position P1, positions of the two cameras relative to the region F become comparison positions, and then the obstacle detection in the region F by the stereo image processing is carried out with a high accuracy. After this, the flow moves to step S204.

Figure 8:
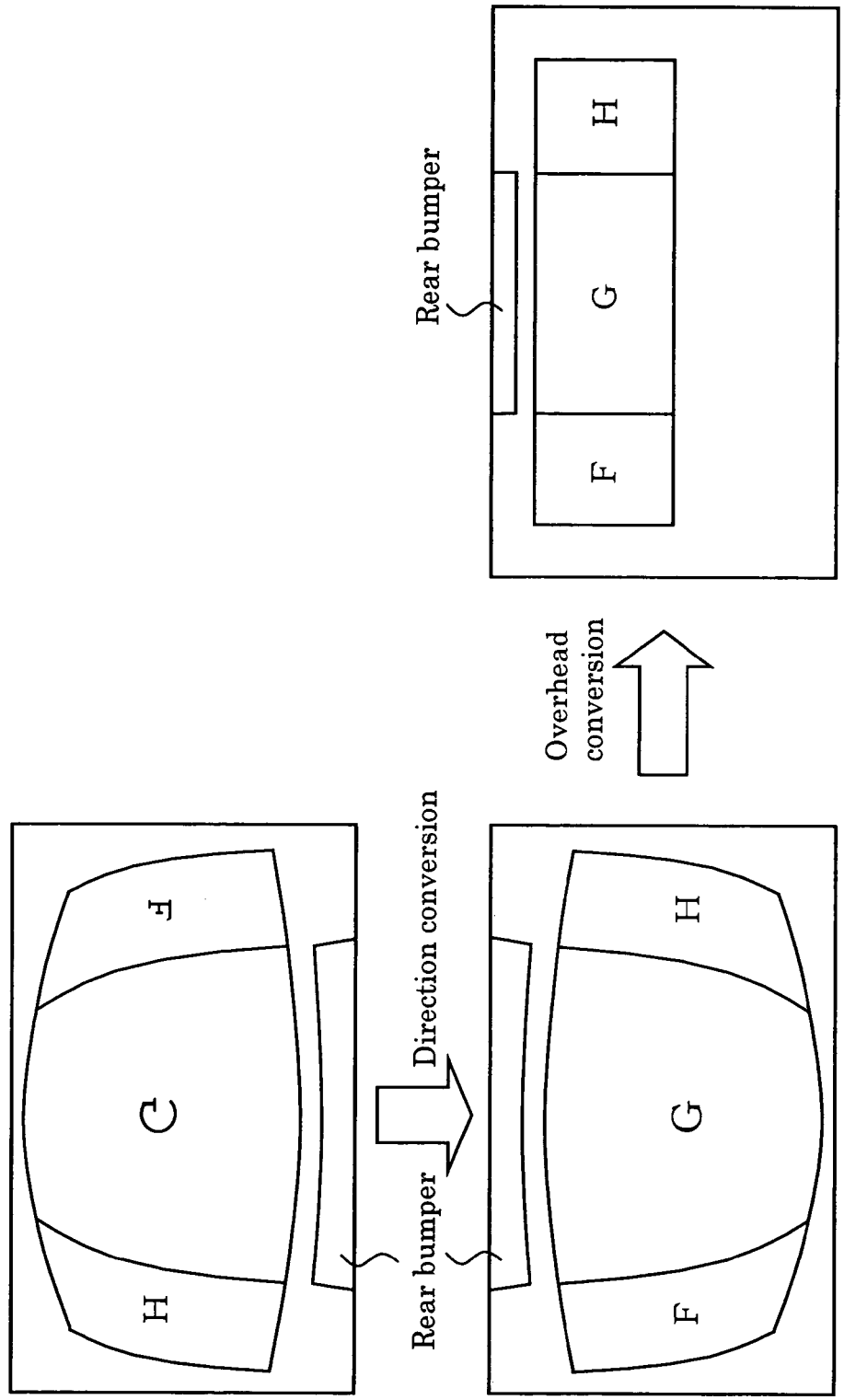
FIG. 8 is a figure showing still another operation of the obstacle detection with two cameras of an embodiment of the present invention.
Figure 9:
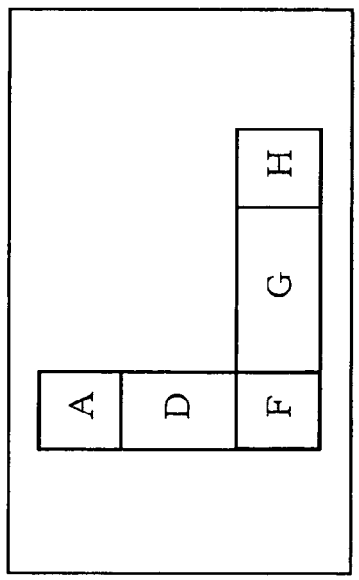
FIG. 9 is a figure showing yet another operation of the obstacle detection with two cameras of an embodiment of the present invention.

In step S204, an image photographed by the rear photographing camera 2B is converted into an overhead image. This photographed image is an image with distortions caused by the lens, and is upside-down, as shown in the upper left figure of FIG. 8 (Note that characters F, G and H in FIG. 8 are characters for explanation, they are not the ones inserted into the image photographed by the left-side photographing camera 2B). The distortions increase as a photographing field angle increases. The image photographed by the rear photographing camera 2B becomes an image shown in the left lower figure of FIG. 8 after being rotated at 180 degrees. After the image rotated at 180 degrees is converted further and the distortion of the concerned image is removed, an image shown in the right lower figure of FIG. 8 is obtained. The overhead image of the left-side photographing camera 2L obtained in step S203 and the overhead image of the rear photographing camera 2B obtained in step S204 are positioned and adjusted, and then an image shown in FIG. 9 is obtained. The region F is photographed by both of the left-side photographing camera 2L and the rear photographing camera 2B as can be seen from this image. The flow then moves to step S205.

Figure 7:
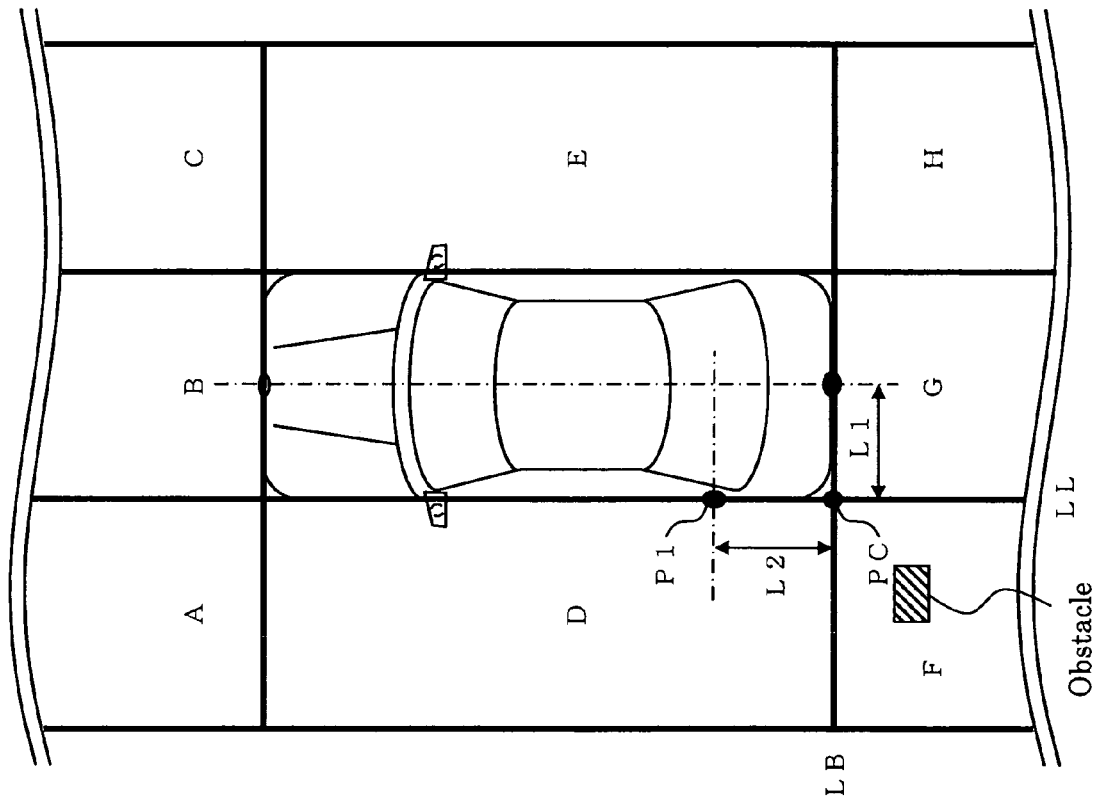
FIG. 7 is a figure showing another operation of the obstacle detection with two cameras of an embodiment of the present invention.

In step S205, the overhead image of the rear photographing camera 2B converted in step S204 is converted into an overhead image from the position P1 in FIG. 7. The flow then moves to step S206.

The steps S205 to S207 show a flow of the obstacle detection by the stereo image processing.

In step S206, differences between the image of the left-side photographing camera 2L converted in step S203 and the image of the rear photographing camera 2B converted in step S205 are calculated. Here, it is assumed that objects in the images photographed by the left-side photographing camera 2L and the rear photographing camera 2B are all on a same surface with the road surface, the image of the rear photographing camera 2B converted in step S205 should be consistent with the image of the left-side photographing camera 2L converted in step S203. Conversely, when the differences of these images are calculated, part of the images where the differences exist is identified as an object which is not on the same surface with the surface of the road, namely an obstacle. The flow then moves to step S207.

In step S207, a coordinate position where the differences have been detected, namely the coordinate position of the obstacle on the display screen is calculated. The coordinate position of the obstacle is set by the coordinate that the differences have been detected. The flow then moves to step S208.

Figure 10:
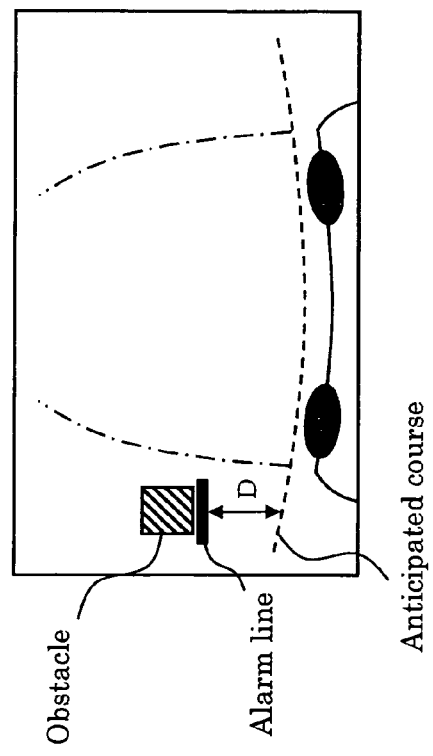
FIG. 10 is a figure showing a displaying example of the obstacle detection of an embodiment of the present invention.

In step S208, by the image processing unit 1C, an alarm line is overlapped and displayed on the coordinate position calculated in step S207, or on the image of the left-side photographing camera 2L or the image of the rear photographing camera 2B in the vicinity of the coordinate position. The alarm line is displayed nearer to the vehicle than the obstacle. FIG. 10 shows one embodiment in which the alarm line is overlapped and displayed on the image of the left-side photographing camera 2L. After this, the flow moves to step S209.

In step S209, the position of the obstacle relative to an anticipated course calculated by the anticipated course calculator 9 is judged. When the position of the detected obstacle is outside of the anticipated course calculated by the anticipated course calculator 9 and is away from the anticipated course equal to or more than a predetermined distance D, it is judged that there is a low possibility that the vehicle will contact the obstacle, and then the flow returns to step S201 and the obstacle alarm is not raised. On the other hand, when the position of the detected obstacle is outside of the anticipated course calculated by the anticipated course calculator 9 and is away from the anticipated course less than the predetermined distance D, it is judged that there is a possibility that the vehicle will contact the obstacle, the flow then moves to step S210 and its following steps which give the obstacle alarm.

In step S210, a judgment of whether the obstacle is approaching the host vehicle or not is carried out. A current position of the obstacle is compared with the position of the obstacle calculated last time, and if the current position of the obstacle is nearer to the host vehicle than the previous one, it is judged that the obstacle is approaching the host vehicle, and the flow moves to step S211 so as to raise an obstacle alarm. On the other hand, if the current position of the obstacle is farther away from the host vehicle than the previous one, it is judged that the obstacle is away from the host vehicle and the obstacle alarm is not raised, and then the flow returns to step S201.

In step S211, the obstacle alarm is raised by flashing the alarm line displayed on the screen of the display unit 3, as well as giving an alarm sound by the warning sound generator 10, to promote attention of the driver.

Hereafter, steps S201 to S211 are repeated.

The obstacle detection in the region F which is photographed by two cameras is carried out by the above-mentioned operation flow. The obstacle detections in the regions A, C and H are carried out by a similar operation flow.

Since a distance from the vehicle to any of the road surfaces displayed on the display unit 3 may be examined previously, it is possible to compute the coordinate position where differences have been detected in step S206 to a distance from the vehicle, and the distance may be displayed on the display unit 3, according to one embodiment of the invention.

Figure 11:
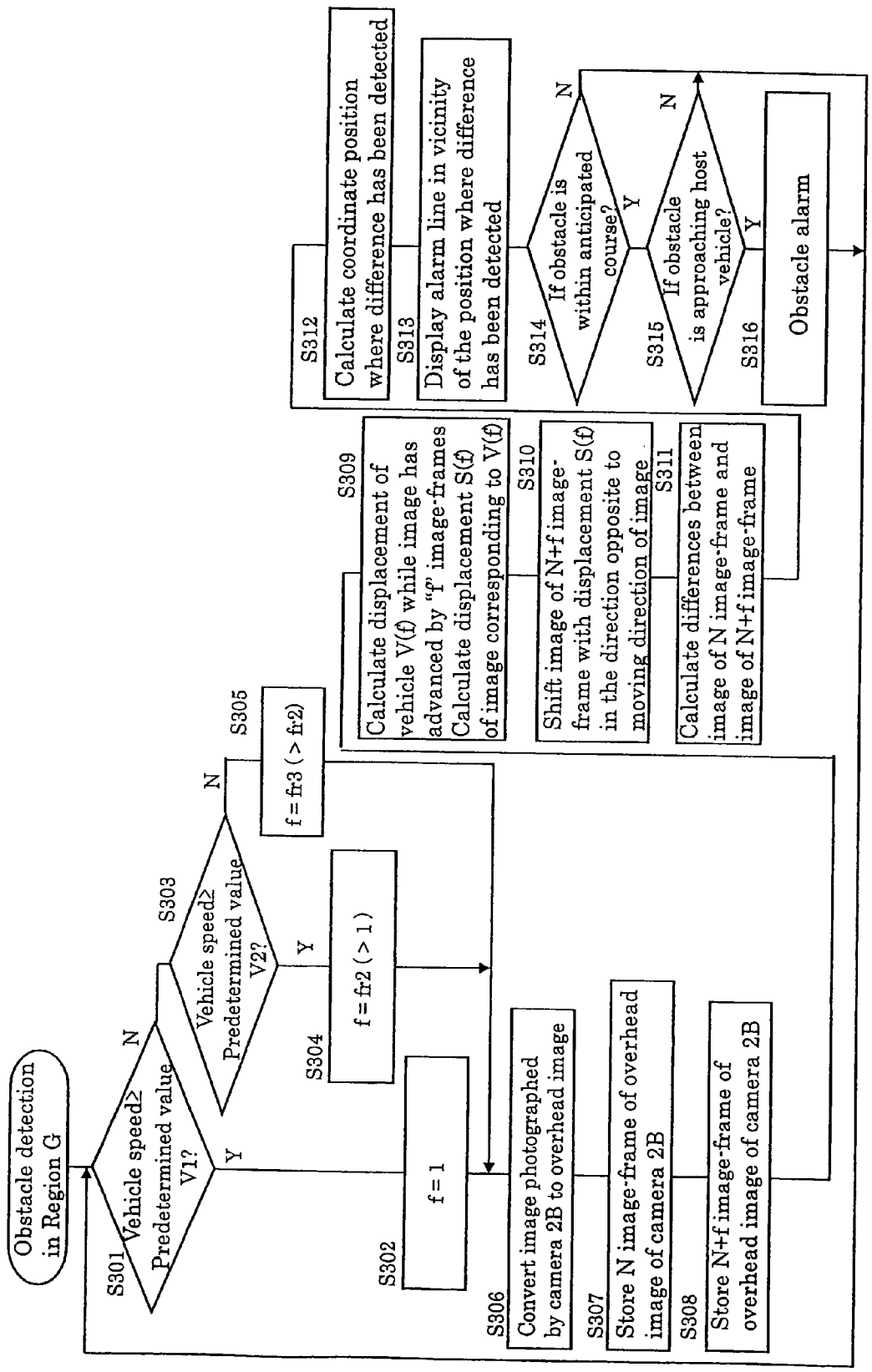
FIG. 11 is a flowchart illustrating the obstacle detection with one camera of an embodiment of the present invention.

Next, operations of the obstacle detection in the regions B, D, E and G that are photographed by one camera will be explained, accompanied with a flow chart shown in FIG. 11 and obstacle detection operations shown in FIG. 12 and FIG. 13. In the present embodiment, a so-called motion-stereo processing is employed, in which an obstacle is detected based on differences between images of the same obstacle photographed by the same camera at different photographing positions, to carry out the obstacle detection. Here, the operation of the obstacle detection in the region G will be explained as an example.

In step S301, a vehicle speed detected by the vehicle speed sensor 4 is judged. If the vehicle speed is equal to or more than a predetermined value V1, the flow moves to step S302. On the other hand, if the vehicle speed is less than the predetermined value V1, the flow moves to step S303.

In step S302, an interval "f" of the image-frame for carrying out the comparison is set. When the vehicle speed is equal to or more than the predetermined value V1, two successive image-frames, i.e., N image-frame and N+1 image-frame are compared, such that value 1 is assigned into "f". After this, the flow moves to step S306.

In step S303, the vehicle speed detected by the vehicle speed sensor 4 is judged. If the vehicle speed is equal to or more than a predetermined value V2 (<V1), the flow moves to step S304. On the other hand, if the vehicle speed is less than the predetermined value V2, the flow moves to step S305.

In step S304, the interval "f" of the image-frame for carrying out the comparison is set. When the vehicle speed is less than the predetermined value V1 and equal to or more than the predetermined value V2, N image-frame and N+fr2 (>1, for example 15) are compared, such that a value fr2 is assigned into "f". The flow then moves to step S306.

In step S305, the interval "f" of the image-frame for carrying out the comparison is set. When the vehicle speed is less than the predetermined value V2, N image-frame and N+fr3 (>fr2, for example 30) are compared, such that a value fr3 is assigned into "f". The flow then moves to step S306.

In step S306, an image photographed by the rear photographing camera 2B is converted into an overhead image. The flow then moves to step S307.

Figure 12:
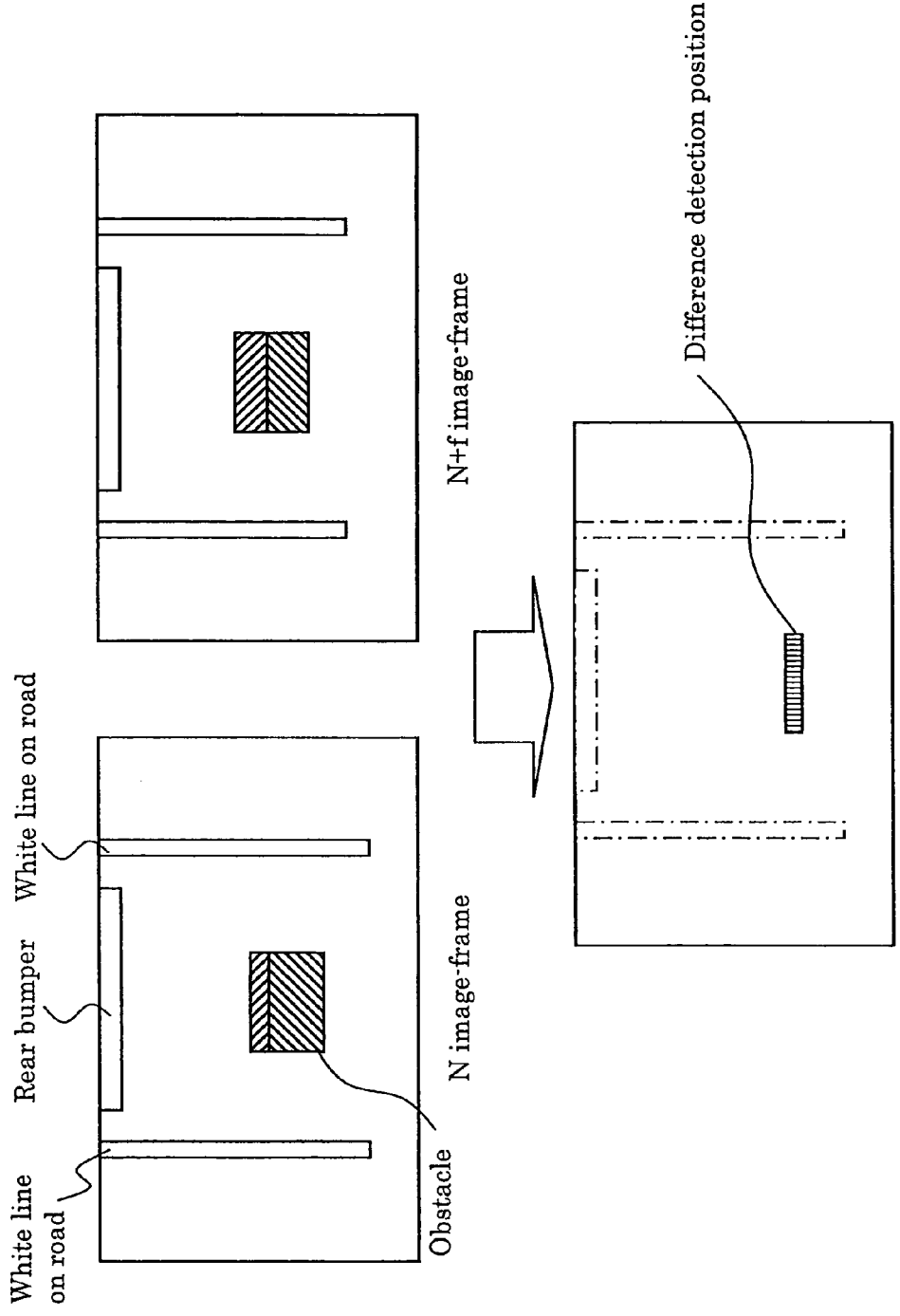
FIG. 12 is a figure showing an operation of the obstacle detection with one camera of an embodiment of the present invention.
Figure 13:
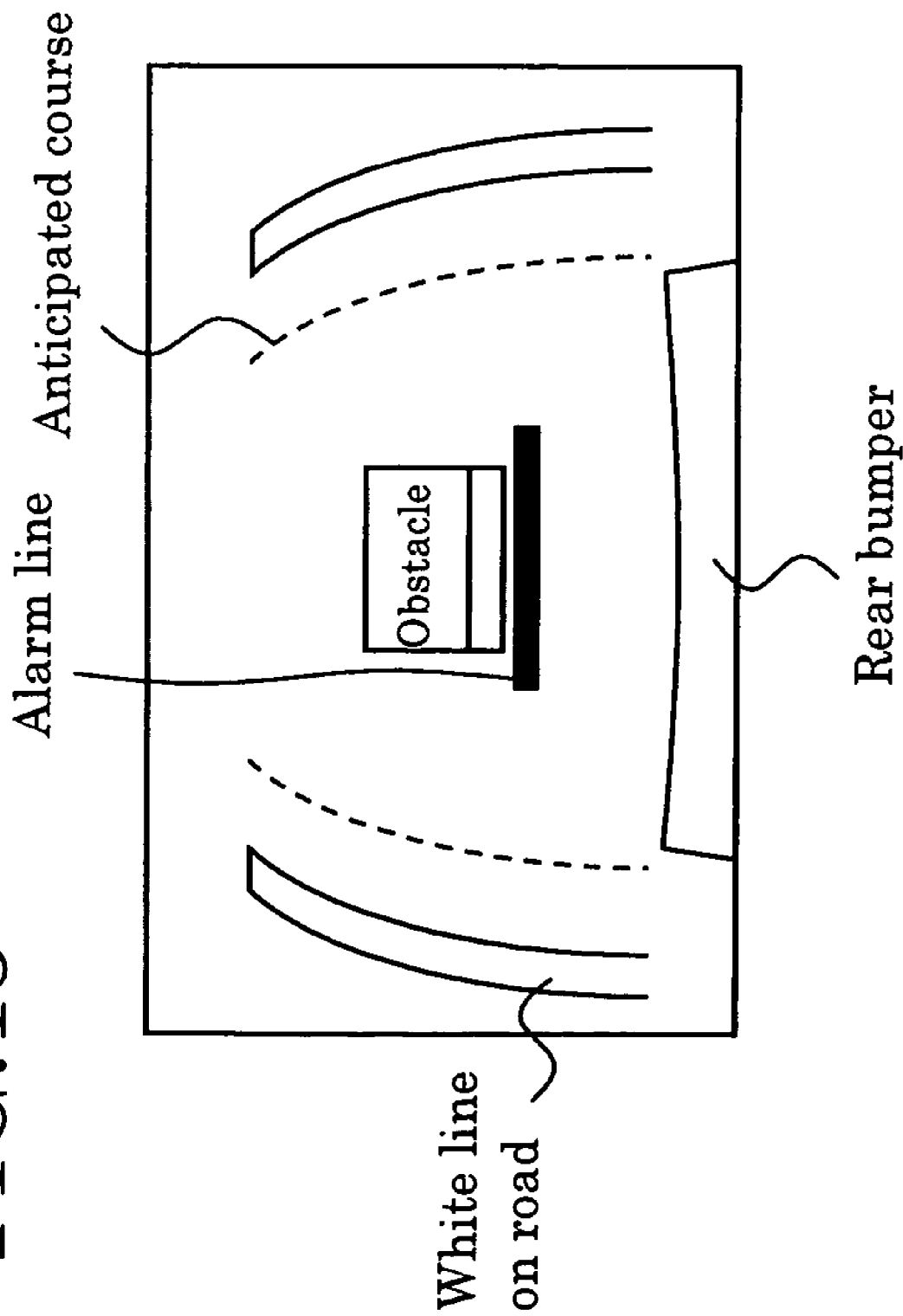
FIG. 13 is a figure showing another displaying example of the obstacle detection of an embodiment of the present invention.

In step S307, an overhead image of the rear photographing camera 2B at a certain point is stored in the memory unit 1B (see FIG. 12). Here, an image-frame of the overhead image recorded is N image-frame. After this, the flow moves to step S308.

In step S308, an overhead image of N+f image-frame of the rear photographing camera 2B is stored in the memory unit 1B (see FIG. 12). The value of "f" is set as follows, i.e., f=1 if the vehicle speed is equal to or more than V1, f=fr2 (>1) if the vehicle speed is less than V1 and equal to or more than V2, and f=fr3 (>fr2) if the vehicle speed is less than V2. The flow then moves to step S309.

In step S309, a displacement of the vehicle V(f) while the image has advanced by "f" image-frames is calculated, and a displacement of the image S(f) corresponding to the displacement of the vehicle V(f) is calculated as well. The displacement of the vehicle V(f) while the image has advanced by "f" image-frames may be calculated from the vehicle speed detected by the vehicle sensor 4 and a required time that the image advances by "f" image-frames. Here, since it is possible to examine a corresponding relationship between the displacement of the vehicle and the displacement of the image previously, so that if the displacement of the vehicle V(f) while the image advances by "f" image-frames is previously calculated, the displacement of the image S(f) while the image advances by "f" image-frames may be calculated. The flow then moves to step S310.

In step S310, the overhead image of N+f image-frame stored in step S308 is shifted with the displacement of the image S(f), in a direction opposite to the moving direction of the image. After that, the flow moves to step S311.

In step S311, differences between the overhead image of N image-frame stored in step S307 and the overhead image of N+f image-frame after being shifted which is obtained in step S310, is calculated (see FIG. 12). Here, it is assumed that objects in the overhead image of N image-frame and objects in the overhead image of N+f image-frame after being shifted are on a same surface with the road surface, the overhead image of N image-frame should be consistent with the overhead image of N+f image-frame after being shifted. Conversely, when the differences of these images are calculated, part of the images where the differences exist is identified as an object which is not on the same surface with the road surface, namely an obstacle. The flow then moves to step S312.

In step S312, a coordinate position where the differences have been detected, namely the coordinate position of the obstacle on the display screen is calculated. The coordinate position of the obstacle is set by the coordinate that the differences have been detected. The flow then moves to step S313.

In step S313, by the image processing unit 1C, the alarm line is overlapped to be displayed on the coordinate position calculated in step S312, or on the image of the rear photographing camera 2B in the vicinity of the coordinate position. The alarm line is displayed nearer to the vehicle than the obstacle. FIG. 13 shows one embodiment in which the alarm line is overlapped to be displayed on the image of the rear photographing camera 2B. The flow then moves to step S314.

In step S314, a position of the obstacle relative to the anticipated course calculated by the anticipated course calculator 9 is judged. When the position of the detected obstacle is outside of the anticipated course calculated by the anticipated course calculator 9, it is judged that the possibility of a contact of the vehicle with the obstacle is low, the flow then returns to step S301 and the obstacle alarm is not given. On the other hand, when the position of the detected obstacle is inside the anticipated course calculated by the anticipated course calculator 9 (refer to FIG. 13), it is judged that there is a possibility that the vehicle will contact the obstacle, the flow then moves to step S315 and its following steps which give the obstacle alarm.

In step S315, a judgment of whether the obstacle is approaching the host vehicle or not is carried out. A current position of the obstacle is compared with the position of the obstacle calculated last time, and if the current position of the obstacle is nearer to the host vehicle than the previous one, it is judged that the obstacle is approaching the host vehicle, and the flow then moves to step S316 so as to raise the obstacle alarm. On the other hand, if the current position of the obstacle is farther away from the host vehicle than the previous one, it is judged that the obstacle is away from the host vehicle and the obstacle alarm is not raised, and then the flow returns to step S301.

In step S316, the obstacle alarm is raised by flashing the alarm line displayed on the screen of the display unit 3, as well as raising an alarm sound by the warning sound generator 10, to promote attention of the driver.

Hereafter, steps S301 to S316 are repeated.

The obstacle detection in the region G which is photographed by one camera is carried out by the above-mentioned operation flow. The obstacle detections in the regions B, D and E are carried out by the similar operation flow.

Since a distance from the vehicle to any of the road surfaces displayed on the display unit 3 may be examined previously, it is possible to compute the coordinate position where differences have been detected in step S312 to a distance from the vehicle, and the distance may be displayed on the display unit 3, according to one embodiment of the invention.

With the operations mentioned above, the vehicle surroundings are divided into a plurality of regions according to the photographing regions of the plurality of cameras, and a plurality of obstacle detection methods are utilized respectively in each region. With such operations, it is possible to improve the accuracy of the obstacle detection.

Moreover, the photographed images are converted into the overhead images to carry out the obstacle detection. With such operations, it is possible to eliminate the effects caused by distortions of lens of the camera and/or the attaching positions of the cameras, and the obstacle detection accuracy is improved.

Furthermore, the conversion table in accordance with the posture of the vehicle is utilized when the photographed image is converted into the overhead image. This operation eliminates the effects of variations of the images resulting from variations of the postures of the vehicle, therefore, it is possible to improve the obstacle detection accuracy.

Additionally, when the obstacle detection is carried out in the region which is photographed by one camera, the interval of the image-frames to be compared is varied in accordance with the vehicle speed. In other words, when the vehicle runs at a high speed, and the image variations between successive image-frames can be obtained sufficiently, the successive image-frames are compared to carry out the obstacle detection. On the other hand, when the vehicle runs at a low speed, and the image variations between two successive image-frames can not be obtained sufficiently, image-frames with a predetermined image-frame interval are compared to carry out the obstacle detection. With such operations, the obstacle detection accuracy is improved.

Moreover, the alarm is given only in at least one of a case in which the obstacle is outside of the anticipated course and not away from the anticipated course a predetermined distance, and a case in which the obstacle is within the anticipated course; therefore, more alarms than necessary will not be given, and the driver and the passengers will not be bothered.

Furthermore, the alarm is given only when the obstacle is approaching the host vehicle; therefore, more alarms than necessary will not be given, and the driver and the passengers will not be bothered.

According to an embodiment of the invention, the amount of the photographing cameras configured to photograph the vehicle surroundings may not be limited to the number described in the embodiment; more cameras may be utilized in the present invention.

According to an embodiment of the invention, the locations of the cameras may not be limited to the attaching positions described in the present embodiment; their attaching positions may be adjusted to be consistent with the outer shape of the vehicle or the like.

According to an embodiment of the invention, in the regions A, C, F and H, the obstacle detection may be carried out by the motion-stereo processing with one camera while the vehicle is moving. Therefore, to improve the obstacle detection accuracy further, in the regions A, C, F and H, the obstacle detection may be carried out by a combination of the obstacle detection based on the stereo image processing with two cameras and the obstacle detection by the motion-stereo processing with one camera, while the vehicle is moving.

According to an embodiment of the invention, the methods of the obstacle alarm are not limited to the methods utilized in the present embodiment; it is possible to utilize the other methods that can draw attention of the driver.

Additionally, according to an embodiment of the invention, outputs of the vehicle speed sensor 4, the yaw-sensor 5, the roll-sensor 6 and the pitch-sensor 7 may be sent and received over CAN (Controller Area Network) which is a standard of the distributed control network, and the controller 1 may get these output signals through CAN.

Furthermore, according to an embodiment of the invention, when the conversion table is selected based on the output signals of the vehicle speed sensor 4, the yaw-sensor 5, the roll-sensor 6 and the pitch-sensor 7, a conversion table to be used after a predetermined time may also be predicted to utilize, based on each of the output signals.

The preferable embodiment of the present invention is described as above, accompanied by the drawings. The descriptions and drawings should be regarded as illustrative in nature and not as restrictive. Accordingly, it should be understood that the present invention covers modifications and variations made to the structure of the present invention such as modification of the design or the like, without departing from the scope or the spirit of the invention.

What is claimed is:

1. An obstacle detector for a vehicle, comprising:
a plurality of photographing units configured to photograph scenes in vehicle surroundings, wherein each optical axis of the plurality of photographing units is disposed at different directions; and
a controller configured to carry out a first obstacle detection that detects an obstacle in the vehicle surroundings based on images photographed by at least two photographing units of the plurality of photographing units, and a second obstacle detection that detects the obstacle in the vehicle surroundings based on two image-frames photographed by at least one photographing unit of the plurality of photographing units,
wherein the controller is configured to carry out at least the first obstacle detection of the first and the second obstacle detections in a region, photographed by the at least two photographing units, of a photographed range photographed by the plurality of photographing units, and
wherein the controller is configured to carry out the second obstacle detection in a region, photographed by the at least one photographing unit, of the photographed range photographed by the plurality of photographing units.

2. The obstacle detector for the vehicle according to claim 1,
wherein the first obstacle detection is carried out such that images photographed by the at least two photographing units of the plurality of photographing units are converted into overhead images and the obstacle is detected based on differences between the overhead images obtained at a same time point, and the second obstacle detection is carried out such that images photographed by the at least one photographing unit of the plurality of photographing units are converted into overhead images and the obstacle is detected based on differences between two image-frames of the overhead images.

3. The obstacle detector for the vehicle according to claim 1,
wherein the controller is configured to utilize two image-frames with a long-time interval to carry out the second obstacle detection when the vehicle runs at a low speed, and utilize two image-frames with a short-time interval to carry out the second obstacle detection when the vehicle runs at a high speed.

4. The obstacle detector for the vehicle according to claim 2,
wherein the controller is configured to utilize two image-frames with a long-time interval to carry out the second obstacle detection when the vehicle runs at a low speed, and utilize two image-frames with a short-time interval to carry out the second obstacle detection when the vehicle runs at a high speed.

5. The obstacle detector for the vehicle according to claim 2,
wherein the controller further includes a posture detector configured to detect a posture of the vehicle, and convert the photographed image into the overhead image based on the posture of the vehicle detected by the posture detector.

6. The obstacle detector for the vehicle according to claim 1,
wherein the plurality of photographing units are disposed on the front, rear, right-side and left-side of the vehicle such that optical axis of two adjacent photographing units of the plurality of photographing units are transverse to each other.

7. The obstacle detector for the vehicle according to claim 1,
wherein the controller is configured to give an alarm when the obstacle is detected to be approaching the vehicle based on a position of the detected obstacle.

8. The obstacle detector for the vehicle according to claim 1,
wherein the controller is configured to give an alarm when a position of the detected obstacle is within an anticipated course of the vehicle or not away from left and right of the anticipated course for a predetermined distance, which anticipated course is calculated by an anticipated course calculator configured to calculate anticipated courses of the vehicle based on a steering angle of a steering wheel of the vehicle.

9. The obstacle detector for the vehicle according to claim 7,
wherein the alarm is warning sound given out by a warning sound generator connected to the controller.

10. The obstacle detector for the vehicle according to claim 8,
wherein the alarm is warning sound given out by a warning sound generator connected to the controller.

11. The obstacle detector for the vehicle according to claim 7,
wherein the alarm is displaying in which a predetermined picture is overlapped in an image containing a detected obstacle of the photographed images which are photographed by the plurality of photographing units, and
wherein the overlapped image is displayed on a display unit provided inside the vehicle.

12. The obstacle detector for the vehicle according to claim 8, wherein the alarm is displaying in which a predetermined picture is overlapped in an image containing a detected obstacle of the photographed images which are photographed by the plurality of photographing units, and wherein the overlapped image is displayed on a display unit provided inside the vehicle.

13. The obstacle detector for the vehicle according to claim 11, wherein the predetermined picture is overlapped in the vicinity of the obstacle and between the obstacle and the vehicle in the image containing the detected obstacle.

14. The obstacle detector for the vehicle according to claim 12, wherein the predetermined picture is overlapped in the vicinity of the obstacle and between the obstacle and the vehicle in the image containing the detected obstacle.

* * * * *